United States Patent [19]
Etessam

[11] 3,774,398
[45] Nov. 27, 1973

[54] GAS GENERATOR

[76] Inventor: Alexander Hossen Etessam, 91 Eldorado Ave., Shemiran, Tehran, Iran

[22] Filed: Oct. 8, 1971

[21] Appl. No.: 187,612

Related U.S. Application Data

[63] Continuation-in-part of Ser. No. 55,379, July 16, 1970, abandoned.

[52] U.S. Cl.................... 60/248, 60/249, 60/244, 60/39.77
[51] Int. Cl............................................. F02k 7/04
[58] Field of Search.................... 60/247, 248, 249, 60/39.77, 244

[56] References Cited
UNITED STATES PATENTS

| | | | |
|---|---|---|---|
| 2,525,782 | 10/1950 | Dunbar | 60/249 |
| 2,628,471 | 2/1953 | Dunbar | 60/39.77 |
| 2,750,733 | 6/1956 | Paris et al. | 60/248 |
| 2,924,071 | 2/1960 | De Paravicini | 60/248 |
| 2,801,515 | 8/1957 | Kadosch et al. | 60/249 |
| 2,834,183 | 5/1958 | Bertin et al. | 60/249 |
| 3,208,214 | 9/1965 | Servanty et al. | 60/249 |
| 2,480,626 | 8/1949 | Bodine | 60/39.77 |

FOREIGN PATENTS OR APPLICATIONS

| | | | |
|---|---|---|---|
| 497,124 | 10/1953 | Canada | 60/248 |
| 767,161 | 1/1957 | Great Britain | 60/248 |

Primary Examiner—Carlton R. Croyle
Assistant Examiner—Warren Olsen
Attorney—Kenyon & Kenyon, Reilly, Carr & Chapin

[57] ABSTRACT

A gas generator for a turbine or jet power plant comprising a pair of coextensive combustion chambers normally coaxially arranged between the inlet and outlet. Precompression of the fuel-air mixture is obtained by the utilisation of a vortex in the air inlet or by-pass passage and the use of resonance chambers, there being no inlet valve.

6 Claims, 7 Drawing Figures

Patented Nov. 27, 1973  3,774,398

Patented Nov. 27, 1973

GAS GENERATOR

INTRODUCTION

The present invention relates to a gas generator for a turbine or jet power plant and to power plant for stationary purposes such as road vehicles, for subsonic aircraft and for supersonic aircraft. This application is a continuation-in-part of my previous application Ser. No. 55,379 filed on July 16, 1970, now abandoned.

SUMMARY OF THE PRIOR ART

The gas generator of the present invention is an improvement of modification of that described in my copending application given above which operates on the pulse jet principle. However the gas generator of the present invention is further removed from the pulse jet principle. In a conventional pulse jet a fuel air mixture is drawn into a combustion chamber which communicates directly with the jet outlet, through a non-return valve, normally some type of flap-valve. The mixture is ignited in the combustion chamber creating an explosion, with the exhaust gases passing through the jet outlet and creating a reduced pressure allowing a fresh charge of fuel air mixture to be drawn in through the non-return valve. The engine thereafter operates with continuous discrete explosions or pulses, normally at frequencies of the order of 100 to 200 pulses per second. Whilst pulse jet engines first came into operation towards the end of World War II with the German V1 weapon they were largely superseded by the gas turbine engine and ram jet both of which allowed continuous throughput of air from inlet to outlet. Thus one of the chief disadvantages of the pulse jet was that it did not allow for continuous throughput of air, the upstream side of the valve normally being at atmospheric pressure. Furthermore, due to the intermittent cycle the efficiency was low. The pulse jet has however two important advantages: firstly it operates at constant volume as opposed to constant pressure at which gas turbines operate and this allows for greater thermodynamic efficiency in the expansion of the gases, and secondly it does not require any moving parts other than the valve components and is therefore extremely cheap and simple to manufacture.

SUMMARY OF THE INVENTION

The present invention provides a gas generator derived from the pulse jet principle, but with a major improvement in performance so that it can be used to provide a cheap and efficient gas generating stage in a number of power plants suitable for different applications including supersonic jet enginges as well as stationary engines and subsonic aircraft engines. In its simplest form, the gas generator itself provides substantially all the necessary components of a jet engine.

The gas generator of my previous application Ser. No. 55,379 comprises a pair of combustion chambers each fitted with non-return valves in the air intake system and which are in effect pulse jets. The nozzles of the pulse jets are arranged to converge together so as to be mutually inductive without the use of tail pipes or other individual scavenging means. The combustion chambers are not individually resonant. Instead, the injection effect of gas from one chamber provides a strong suction in the other chamber enabling rapid filling of the chamber before ignition. In this way the combustion chambers operate as pulse jets in alternate sequence with the ignition cycle in one chamber creating a reduced pressure in the other chamber thereby assisting the fuel air intake and at the same time creating or allowing continuous throughput of air from the inlet to the outlet.

While the invention of my above-mentioned application operates satisfactorily the use of non-return valves in the air intake system is a serious commercial disadvantage adding as it does to the expense of the engine and increasing the number of moving parts, reducing the operating time between servicing and increasing the likelihood of failure. At the same time, the degree of precompression of the fuel-air mixture prior to ignition is limited.

It is an object of the present invention to overcome or reduce the above disadvantages contained in the invention of my above-mentioned U.S. application and to improve upon the efficiency of the prior art pulse jets.

In the gas generator of the present invention I utilize a valveless air intake means at the inlet end of each combustion chamber and at the same time I provide means for precompressing the fuel-air mixture in each combustion chamber prior to ignition.

Thus according to one form of the invention I provide a gas generator for a turbine or jet power plant comprising a housing having an air inlet and an exhust outlet, only two substantially coextensive combustion chambers of substantially equal volume located between said inlet and said outlet, valveless air intake means at the inlet end of each said combustion chamber separating said combustion chamber from said air inlet and providing preferential expansion of combustion gases through said exhaust outlet, means for generating a fuel-air mixture upstream of said air intake means, means for pre-compressing said fuel-air mixture prior to ignition, means for igniting said fuel-air mixture in said combustion chambers, said combustion chambers converging directly and without individual scavenging means to said exhaust outlet in the form of mutually inductive nozzles whereby the combustion chambers operate in pulses in alternate sequence with the ignition cycle in one chamber creating a reduced pressure in the other chamber thereby assisting the fuel-air intake.

In the preferred form of my invention, the combustion gases escaping through the valveless air intake are utilised to generate an alternating vortex in the air inlet or a passage leading from the air inlet to the intake means or in a by-pass passage with which the intake means communicate. I prefer to provide for the air intake means to communicate with an air by-pass passage through a reverse flow duct so that in addition to maintaining the vortex the exhaust gases increase the transmission velocity and mass flow of the total exhaust.

By "alternating vortex" is meant a vortex in which the radial direction of the air continuously alternates although the spin direction normally remains constant. An alternating sink-source relationship is created and maintained in the air passage adjacent the two air intake means. Thus the air intake of the combustion chamber during the intake cycle acts as a pressure sink to the vortex. The velocity of the intaken air is correspondingly increased, or in other words the energy of the air is increased. As the velocity is reduced in the combustion chamber, which acts as a diffuser, the increased kinetic energy is utilised in increasing the local static pressure in the combustion chamber prior to ignition.

In one preferred form the gas generator comprises a pair of equivolume annular and generally radially extending combustion chambers disposed on a common axis so that the exhaust emanates from the radial extremity of the combustion chambers. It is convenient to provide an annular air passage separating the combustion chambers and within which the vortex may be conveniently generated and maintained. The air intakes to the two combustion chambers will then be disposed in opposed relationship on two opposite sides of the central disc-like air passage. Resonance chambers may be utilised in addition to the vortex and if desired means may be provided for constricting the air intake means of each combustion chamber at the beginning of the combustion cycle and for operating the constricting means and the fuel-air mixture generating and igniting means in co-operation to obtain alternate pulse operation of the gas generator. Thus the chambers may be constructed to provide induced oscillation of the intake means.

In this form, the air intake means may include a recessed member and a co-operating tongue member defining a reverse flow passage, one of said members being reciprocable under the action of the expanding combustion gases.

While the invention will be described essentially in terms of a gas generator, it will be clear to those skilled in the art how to adapt the gas generator for use in a power plant. The power plant may be of any known type and may employ a compressor in the air inlet and a turbine driven by the exhaust gases. The particular embodiment or embodiments in which the combustion chambers extend generally radially from intake to exhaust will be of a substantially disc-like shape and may be conveniently used as vertical take-off units or hovercraft units.

BRIEF DESCRIPTION OF DRAWINGS

Embodiments of the invention are hereafter described in greater detail with reference to the accompanying drawings in which:

FIG. 1 illustrates the operation of a simplified vortex system. A vortex is generated in general wherever a pressure differential is produced in any continous fluid system. Thus in an atmospheric whirlwind the air flows in towards a reduced pressure point at ground level and disperses in the upper atmosphere at a high pressure point. The low pressure point is known as a sink and the high pressure point as a source. The air approaching the sink accumulates kinetic energy and draws and accelerates yet more air towards the sink.

Turning to FIG. 2 there is shown a gas generator fitted within an engine housing structure 10 defining an air inlet 11 and an exhaust outlet 12 and providing a mounting structure for a pair of combustion chambers A, B. Each combustion chamber includes a main diffuser portion 13 narrowing to an exhaust throat 14 as it approaches the outlet 12 and narrowing towards an air intake means generally indicated at I. It will be appreciated that the combustion chambers A, B are annular about the axis X—X of the gas generator and are of generally disc-like form, extending radially, i.e., with their radial cross-sectional dimension greater than their axial cross-sectional dimension.

Figure 1:
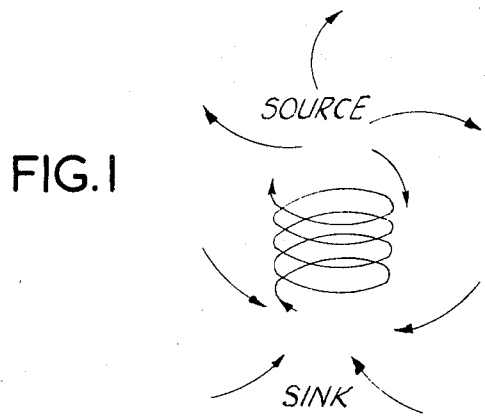
FIG. 1 is a schematic illustration of a vortex system.

Disposed between the combustion chambers A, B is a central air by-pass passage P with which the intake means I communicate. The passage P is of substantially uniform area in the radial direction. Each intake means I comprises a recessed member 15, 15' which are constructed substantially in mirror image relationship. The members 15, 15' are each provided with an annular recess 16, 16' of arcuate cross-section.

A tongue member 17 forming the interior wall of combustion chamber A, extends partially into the recess 16 of member 15 so as to define a generally U-shaped reverse flow air intake passage 18. Combustion chamber B is provided with equivalent structures 17', 18'.

Members 15, 15' are connected together by struts 19 of aerofoil cross-section to provide an integrated structure having a cylindrical inner surface 20. The intake members 15, 15' have frusto-conical interior walls 21, 21' and concave outer walls 22, 22' which define with walls 23, 23' of combustion chambers A, B, a generally toroidal chamber 24, 24'.

The chambers 24, 24' may be designed as resonance chambers but as shown form lower extensions of the combustion chambers, serving as expansion chambers for the oscillation mechanism to be described and raising the air intake passages to a higher velocity zone of the vortex.

The lower ends of intake members 15, 15' are integrated with cylindrical support members 25, 25' which are axially slidable to a limited extent on a suitable bearing structure forming part of the housing 10. The right hand end position of the structure 15, 15' is shown in full lines and the left hand end position in broken lines. A skin of combustion chamber wall material, 26, 26' covers the gap produced when the structure 15, 15' moves away from the outer wall of the corresponding expansion chamber.

Fuel injectors 27, 27' are provided in respective combustion chambers A, B at positions based downwstream of the air intake means I and are provided with separate fuel lines 28, 28' leading to a reciprocating action pump 31 fed from a fuel supply (not shown). Separate igniters 29, 29' are provided with separate leads 30, 31' fed from a high tension source (not shown) through a spark distributor or other distributor 40 for starting purposes. When fully operational, ignition is taken over by glow igniters 41, 41'.

The fuel injectors and igniters are arranged to operate in synchronism to provide for alternate explosions in the combustion chambers A, B. For this purpose the pump 31 and distributor 40 are both driven by the induced reciprocation of the structure 15, 15'. The reciprocation is induced by the alternating pressure in chambers 24, 24' resulting from combustion, the structure 15, 15' being resiliently suspended in a central position by springs 33 which rest against abutments 34 connected to cylinders 25, 25' and parts of the housing 10. Thereby, movement of the intake structure 15, 15' operates the fuel injectors 27, 27' and the igniters 29, 29' in synchronism in a controlled cycle.

It will be noted that the ducts 18, 18' are very much more constricted adjacent the passage P than in the combustion chambers, and in the constricted position they may nearly, although not completely, close the passages 18, 18'.

In operation air is shown entering combustion chamber A with the structure 15, 15' in its right hand (open) position. Chamber A is at a reduced pressure induced by combustion in chamber B, and the intake passage 18 is fully open. The air enters the combustion chamber at high velocity, due to the vortex to be explained, slows and increases in pressure in the diffuser zone 13 and is mixed with injected fuel and the mixture increases in pressure and is ignited. The combustion cycle is meanwhile taking place in combustion chamber B and will be described in relation to this chamber. The passage 18' is fully constricted at the start of combustion and, as shown by the arrows most of the exhaust gases pass through the exhaust throat 14 into the exhaust outlet 12, where they induce a reduced pressure in chamber A. A portion of the exhaust gas enters the extension chamber 24' where it is compressed causing movement of the structure 15, 15' to the left, opening passage 18' ready for air intake. The remainder of the exhaust gases pass out at high velocity through the constricted but gradually opening intake passage 18' where they are reversed in flow so as to travel with the by-pass air in passage P to augment its transmission speed and mass flow. At the same time, these exhaust gases travel away from the axis X—X, which is also the vortex axis, creating a vortex source. This increases the velocity of the air entering passage 18 augmenting the pre-ignition pressure.

Part of the intaken air is transmitted past the combustion chambers through passage p to mix with the exhaust gases in the exhaust outlet 12. This not only cools the combustion chamber walls but augments the mass flow of the total exhaust gases.

The incoming air entering at inlet 11 tends to spin in the passage P about the axis X—X but the production of the vortex is caused in the main by the exhaust gases leaving the constricted passage 18 or 18' at high velocity in a direction away from the axis X—X, therefore the kinetic energy of the vortex will increase and diminish in pulses and at the same time the source and sink alternate from one end of the vortex to the other.

Figure 2:
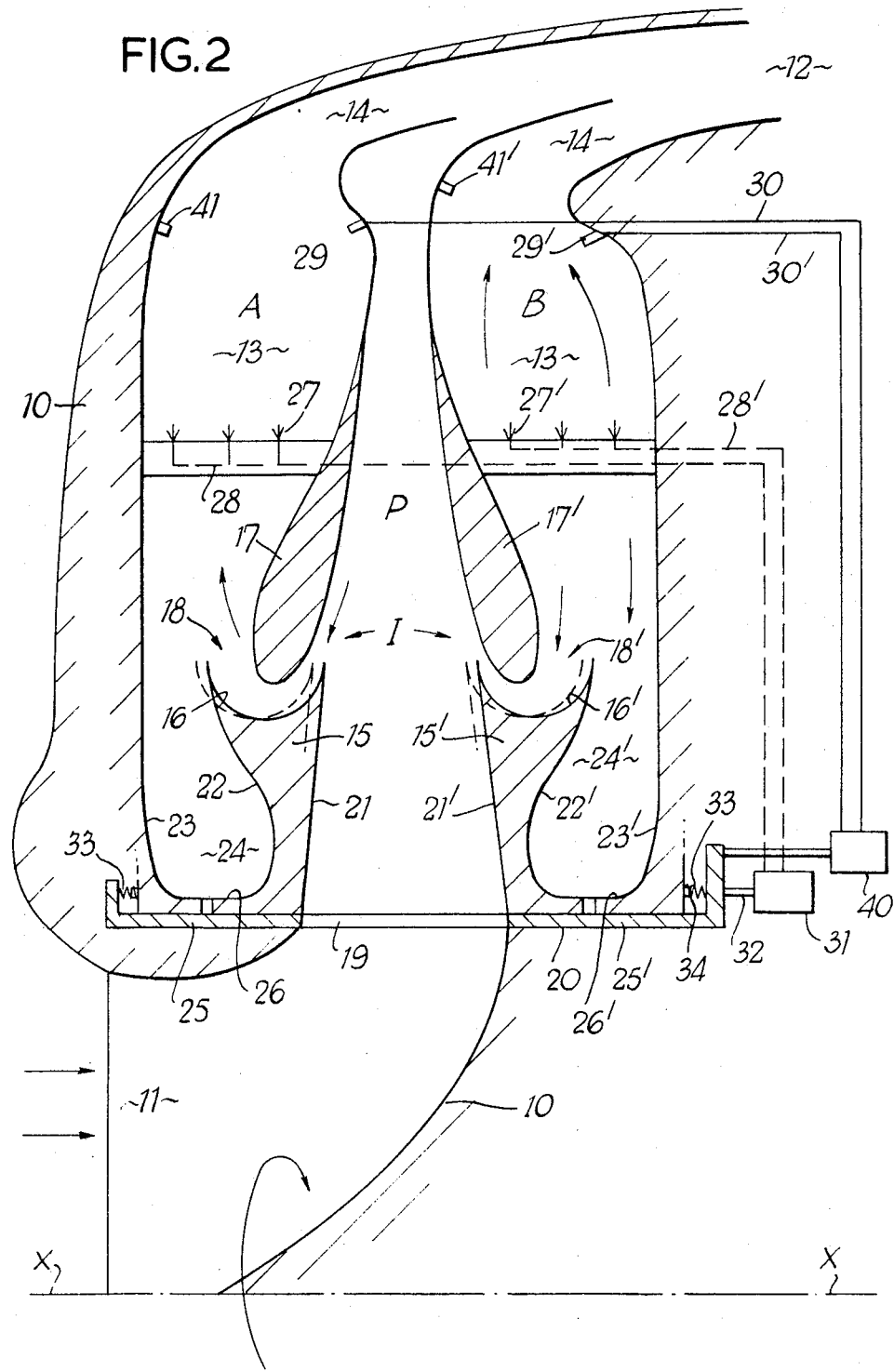
FIG. 2 is a schematic semi-axial sectional view of a gas generator of the invention.

The operation and function of the vortex, which is of fundamental importance to the invention, will be better appreciated from a comparison of FIG. 1 and FIG. 2. FIG. 1 illustrates the phenomenon, which is fully mathematically described in the art, that the superimposition of a source and sink generates a vortex. To provide the source, it is necessary to establish a radially outward flow of air at one axial end of a cylindrical body of air, which, in the embodiment illustrated in FIG. 2, is contained in the disk like passage P. The source is established by the reverse flow duct 18' in the phase of operation illustrated in which combustion chamber B is in its combustion and expansion cycle. Simultaneously, in this phase of operation, a sink is established by the radially inward advance of air from the passage P, as its axially opposite end, into the corresponding duct 18, induced by the reduced pressure in the chamber A which is in its intake cycle.

When the phase alternates so that combustion chamber B is in its intake cycle and combustion chamber A is in its combustion cycle the source and sink are reversed, i.e., the axial end of the vortex adjacent chamber B becomes the sink. The spin direction of the vortex remains unchanged and the spin velocity is maintained.

The overall direction of air flow being radially outward with respect to the vortex, from inlet 11 or outlet 12, the sink, i.e., the radially inward flow into the intake 18 will make a relatively smaller contribution to the maintenance of the vortex than the source. Nevertheless, the air entering the sink side combustion chamber during the intake cycle will be high velocity air from the vortex which, after slowing down in the diffuser section 13, will increase the static pressure prior to combustion. This effects a substantial improvement over conventional pulse jet gas generators in which little or no precompression occurs and the benefits of gas turbine operations are simulated without the necessity for the complex rotary components.

Figure 3:
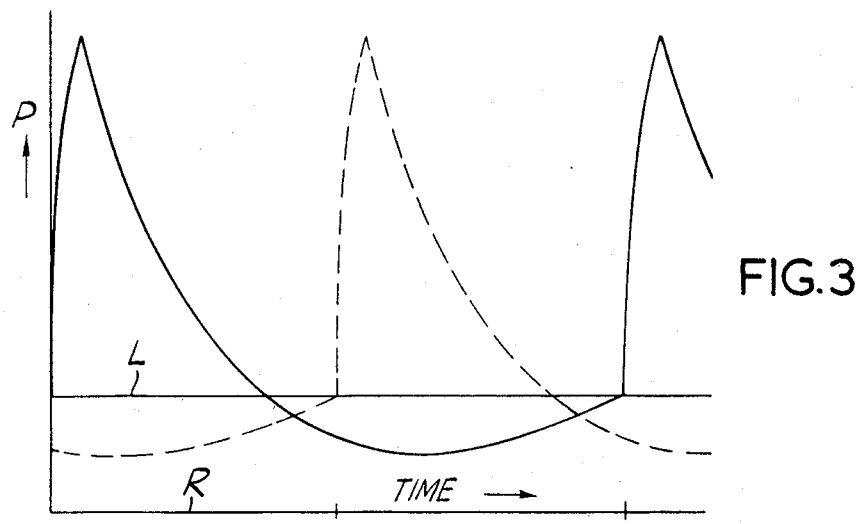
FIG. 3 is a pressure time graph showing the explosion sequence.

The pressure time relationship of the two combustion chambers is illustrated in FIG. 3, in which the pressure graph of one combustion chamber is indicated in full lines and that of the other chamber is indicated in broken lines. The pressure L is the pressure immediately before explosion which can be considered to be a precompression pressure or the pressure to which the combustion chamber substantially reverts after combustion. Due to the mutually conductive relationship between the exhaust nozzles or throats 14 of the adjacent combustion chambers, the explosion in one will reduce the pressure in the other below the level L, assisting the drawing in of air through the intake. However due to the vortex, the pressure level L will be higher than the atmospheric or external pressure R, so that the combustion takes place at a higher pressure than that prevailing in the gas generator of my said previous application Ser. No. 55,379 with consequent increase of combustion efficiency.

Figure 4:
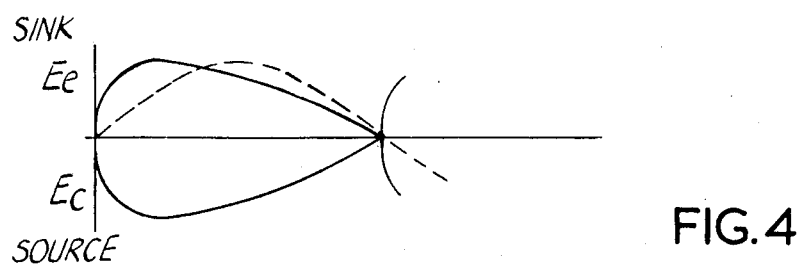
FIG. 4 is a corresponding energy time graph of the vortex system on the same time scale.

FIG. 4 shows the corresponding energy graph for the alternating vortex. The broken lines indicate diagrammatically the reciprocation of the intake structure 15, 15' which will be a simple sinusoidal reciprocating motion at very high freqency. The pulses generated at the intake in the form of sink energy on one side of the passage P and source energy on the other will not follow the sinusoidal curve strictly but in a pulsing manner.

It is not necessary to reciprocate the intake structure to provide for a converging and expanding outlet to the exhaust gases although this helps to increase efficiency and maintain the vortex. This feature may be omitted in other suitable designs. Furthermore, while it is not necessary to use a compressor at the air intake, this could be provided if desired. Furthermore, it is not necessary to use a central air passage between the combustion chambers. The air passage could equally well surround the combustion chambers or indeed could be split so as to surround the chambers and pass in between them.

Figure 5:
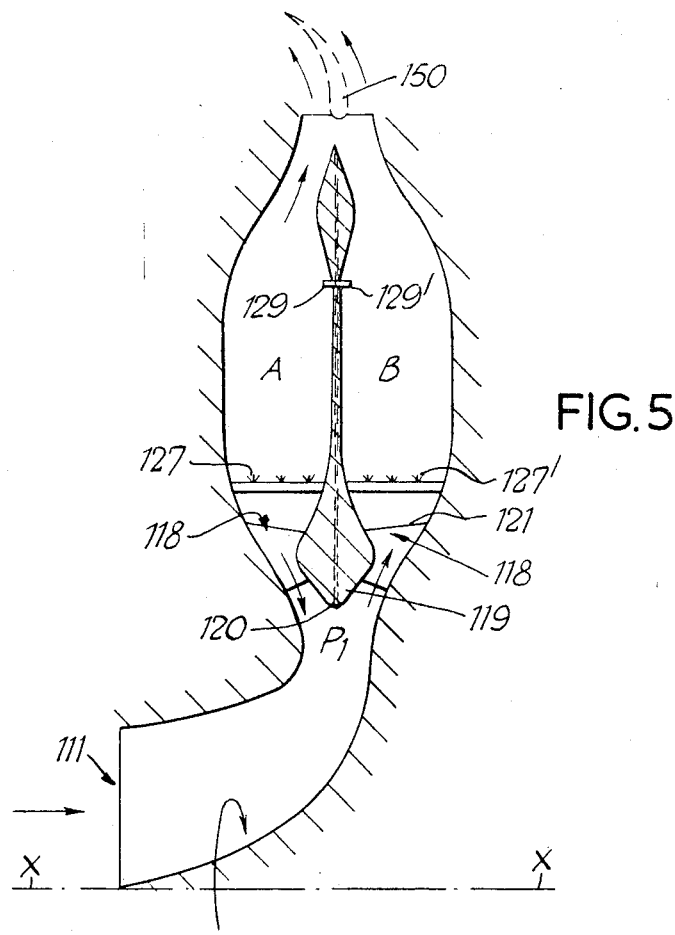
FIG. 5 is a schematic semi-axial section through another gas generator of the invention.

FIG. 5 illustrates an embodiment in which no by-pass air passage or reciprocating intake is used and the pre-ignition pressure is raised simply through the aid of a vortex. In this case the combustion chambers A, B are again of annular form similar to the combustion chambers of FIG. 2 and arranged about an axis X—X in a similar way. The air inlet 111 leads to an annular air passage $P_1$ which is radially inward of the combustion chambers and leads directly to the air intakes which are in the form of annular nozzles or slits 118. The combustion chambers A, B are adjacent and divided by a disc-like central wall 119 which is of suitable external shape. The wall may be provided with a central air passage or passages 120 which allow bleed air to pass through for cooling purposes. The wall 119 may be supported by aerofoil sectioned struts 121 or equivalent means. Fuel injectors 127, 127' are provided at the lower ends of the respective combustion chambers and are operated alternately e.g., by utilising bleed pressure from the combustion chambers for power and synchronisation. Similarly igniters 129, 129' are provided in respective combustion chambers and may also be operated in synchronism alternately together with the fuel injection means, for starting purposes, although again a simple glow igniter may be used once a resonant pulse operation has been obtained.

In operation an alternating vortex is generated in the incoming air in passage $P_1$ and will induce a sink-source relationship in the passages 118, 118' which provides the necessary precompression in the fuel-air mixture before ignition. The high velocity exhaust gases, being directed towards the axis X—X, create a sink.

In the embodiment of FIG. 5 the exhaust gases are shown being dispersed around the rim of the structure instead of converging around towards a cylindrical exhaust nozzle. A rim nozzle of this kind may be used for example in an engine designed for vertical take-off aircraft or hovercraft. Guide vanes 150 may be deployed in the exhaust nozzle. These may be for example aerofoil sectioned designed to produce lift. In other words they act as wings or aelerions.

Figure 6:
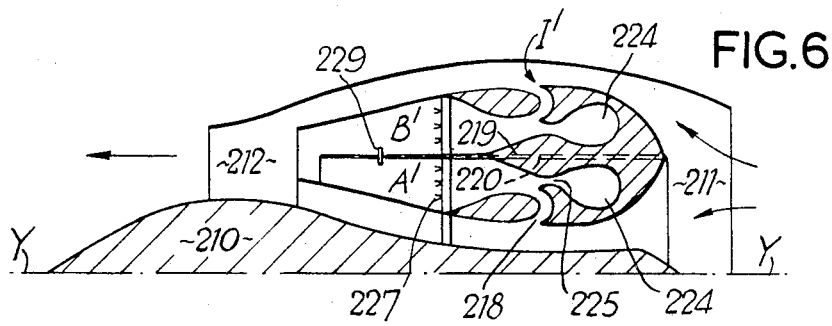
FIGS. 6 and 7 are similar views of yet other embodiments.

The embodiment of FIG. 6 differs from the embodiments of FIGS. 2 and 5 in that the extension of the combustion chamber is parallel and coaxial with the axis Y—Y of the engine instead of being normal to the axis of the engine. While a vortex could be produced in this type of structure the axis of the vortex would have to be normal to the axis Y—Y and the embodiment of FIG. 6 is not intended for use with a vortex.

The combustion chambers A', B' are annular and concentric. Since they are of equal volume the combustion chamber B' will be of smaller radial cross-sectional dimension. As in the embodiment of FIG. 5 the combustion chambers are divided by a wall 219 provided with a central air cooling passage 220 although the wall will in this case be generally cylindrical. The combustion chambers A', B' are again provided with mutually inductive nozzles as illustrated and also with similar but fixed air intake means I'. However the chambers 24, 24' (here indicated at 224) are constructed with constricted entrance throats 225 and operate as resonance chambers. No provision is made for movement of either of the wall members defining the reverse flow air intake ducts 218. The various structural members are supported on a central housing hub 210, the air entering through inlet 211 and passing around the outer walls of the two adjacent combustion chambers to mix with exhaust at the exhaust outlet 212 and with exhaust leaving alternate combustion chambers through the reverse flow ducts 218. In this embodiment it will be apparent that the exhaust gases whether preceding from the mutually inductive nozzles or the intake means is directed in a direction out through the exhaust outlet 212. For precompression purposes reliance is placed upon the resonance chambers 224. During combustion, part of the exhaust gases is compressed and trapped in the corresponding chamber 224 and this gas expands during the intake cycle to increase the pre-ignition pressure of the fuel-air mixture. The resonance chambers 224 require to be carefully constructed to resonate in operation with the combustion chambers. Thus the volume and the area of the restricted throats 225 which lead from the combustion chambers to the resonance chambers adjacent the reverse flow passages 218 will be critical. Their proportions may be calculated in broad terms by those skilled in the art but complete tuning for optimum resonance will vary with engine size and design so that some adjustment of the critical dimensions by trail and error will be necessary. Furthermore, the relative proportions of the areas of the passages 218 and the throats 225 will vary with individual engine designs. Again ignition means 229 are provided for each combustion chamber and also synchronised fuel injection means 227 may be operated as described in other embodiments.

The embodiment of FIG. 7 generally follows that of FIG. 6 and only the different structure will be described, the same reference numerals as in FIG. 6 being used for equivalent structure.

Figure 7:
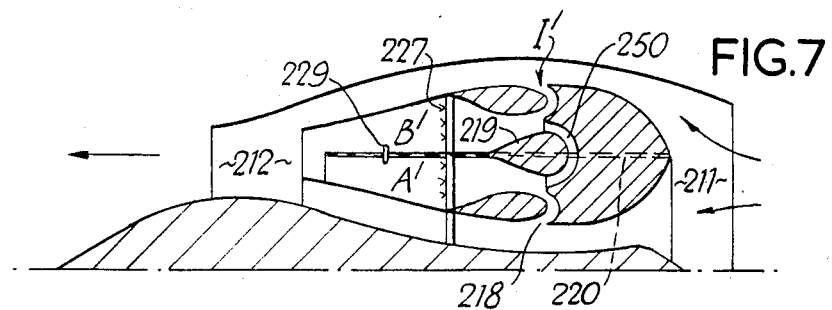

In the embodiment of FIG. 7 the resonance chambers 224 are omitted and instead communication is made between the inlet ends of the two combustion chambers through a connecting duct 250. Thus in this embodiment, instead of a proportion of the expanding combustion gases being compressed and trapped in a chamber, this proportion is fed to the alternate combustion chamber where it precompresses the incoming air entering through intake passage 218. Again the proportions will vary from design to design and while some adjustment will be necessary to obtain optimum performance by varying the area of the duct 250, any such adjustment is relatively simply to carry out.

Whereas various features of the invention have been described in connection with different embodiments, clearly any feature of one embodiment which can be usefully used in a feature of another embodiment may be added.

What I claim is:

1. A gas generator comprising
   only two equivolume annular and generally radially extending combustion chambers disposed on a common central axis,
   an annular air passage separating the combustion chambers,
   a central air inlet leading to said annular air passage,
   an annular section axially extending exhaust duct communicating with radially outer ends of said combustion chambers and said air passage,
   said combustion chambers including opposed valveless air intake means communicating with said air passage, diffuser sections radially outwardly of the air inlet means and exhaust throats leading from the diffuser section to said exhaust duct in mutually inductive relationship,
   fuel injection means and ignition means in each combustion chamber, and
   means for operating said fuel injection means for operating said combustion chambers in an alternate cycle, whereby an alternating vortex is generated in operation in said air passage, augmenting the pre-ignition pressure of the fuel-air mixture, said combustion chambers converging directly and without individual scavenging means into said exhaust outlet in the form of mutually inductive nozzles whereby the combustion chambers operate in pulses in alternate sequence with the ignition cycle in one chamber creating a reduced pressure in the other chamber thereby assisting the fuel-air intake.

2. A gas generator as claimed in claim 1 including a reverse-flow air intake passage situated radially inward of said diffuser section and radially outward of the inner end of each combustion chamber, said passage leading out of said combustion chamber towards said inlet and reversing so as to lead into said air passage radially outwardly towards said exhaust outlet, said fuel injection means in each said combustion chamber being at a position downstream of said intake passage, whereby a vortex source is created in said air passage during combustion.

3. A gas generator comprising
an exhaust outlet,
an air inlet,
only two equivolume combustion chambers communicating with said air inlet and exhaust ducts,
an air passage disposed between said combustion chambers and communicating with said air inlet and exhaust outlet,
valveless air intake means leading to each combustion chamber from opposite sides of said air passage,
means for generating and igniting a fuel-air mixture in each combustion chamber alternately, said intake means leading radially outwardly into said air passage for generating in operation, an alternating vortex in said air passage with said air intake means operating in alternate sink-source relationship, whereby the pre-ignition pressure of the fuel-air mixture is increased, said combustion chambers converging directly and without individual scavenging means into said exhaust outlet in the form of mutually inductive nozzles whereby the combustion chambers operate in pulses in alternate sequence with the ignition cycle in one chamber creating a reduced pressure in the other chamber thereby assisting the fuel-air intake.

4. A gas generator as claimed in claim 3 including means operable under the pressure of the combustion gases for constricting said air intake means of each combustion chamber at the start of combustion and means for operating said fuel-air mixture generating and igniting means in co-operation with said constricting means to obtain alternate pulse operation of said gas generator.

5. A gas generator as claimed in claim 4 wherein said air intake means includes a recessed member and a co-operating tongue member defining a reverse-flow passage, one of said members being reciprocable under the pressure of the combustion gases to constrict one end of said passage and simultaneously expand the other end.

6. A gas generator as claimed in claim 5 wherein said reciprocable member is drivingly connected to a fuel pump of said fuel-air mixture generating and igniting means for supplying fuel alternately to said combustion chambers.

* * * * *